United States Patent
Felton et al.

(10) Patent No.: US 7,603,515 B1
(45) Date of Patent: Oct. 13, 2009

(54) MIDPLANE-INDEPENDENT IMPLEMENTATIONS OF DATA STORAGE SYSTEM ENCLOSURES

(75) Inventors: Mickey S. Felton, Sterling, MA (US); Albert F. Beinor, Jr., Sutton, MA (US); Douglas E. Peeke, Shrewsbury, MA (US); Joseph P. King, Jr., Sterling, MA (US); Ralph C. Frangioso, Jr., Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/839,897

(22) Filed: Aug. 16, 2007

Related U.S. Application Data

(62) Division of application No. 10/402,594, filed on Mar. 28, 2003, now Pat. No. 7,516,272.

(51) Int. Cl.
*G06F 13/12* (2006.01)

(52) U.S. Cl. .......................... 711/112; 710/74; 361/728

(58) Field of Classification Search ................. 711/112; 710/74; 361/728
See application file for complete search history.

(56) References Cited

U.S. PATENT DOCUMENTS

| | | | |
|---|---|---|---|
| 3,781,797 A | 12/1973 | Jinbo | |
| 4,754,344 A | 6/1988 | Shoji et al. | |
| 5,603,056 A | 2/1997 | Totani | |
| 5,673,132 A | 9/1997 | Carbone, Jr. et al. | |
| 5,887,158 A | 3/1999 | Sample et al. | |
| 5,890,214 A | 3/1999 | Espy et al. | |
| 5,901,151 A | 5/1999 | Bleiwiess et al. | |
| 6,076,142 A | 6/2000 | Corrington et al. | |
| 6,209,060 B1 | 3/2001 | Machida | |
| 6,230,217 B1 | 5/2001 | Tuccio et al. | |
| 6,317,800 B1 | 11/2001 | Westby et al. | |
| 6,388,591 B1 * | 5/2002 | Ng | 341/100 |
| 6,421,711 B1 | 7/2002 | Blumenau et al. | |
| 6,425,049 B1 | 7/2002 | Yamamoto et al. | |
| 6,430,714 B1 | 8/2002 | McAdam et al. | |
| 6,434,498 B1 * | 8/2002 | Ulrich et al. | 702/115 |
| 6,473,301 B1 | 10/2002 | Levy et al. | |
| 6,517,358 B2 | 2/2003 | DeBlanc et al. | |

(Continued)

OTHER PUBLICATIONS

Phillips Semiconductors, The 12C-bus and how to use it, Apr. 1995, pp. 1-24.*

(Continued)

*Primary Examiner*—Christian P Chace
*Assistant Examiner*—Jared I Rutz
(74) *Attorney, Agent, or Firm*—Guerin & Rodriguez, LLP; Michael A Rodriguez

(57) ABSTRACT

Described is a midplane-less storage system comprising an enclosure including a control board having an electrical connector attached thereto and a processing unit. The enclosure also includes a disk drive module with a disk drive for storing data and an adapter board electrically connected to the disk drive. The adapter board has a controller and an electrical connector that is mated to the electrical connector of the control board. A communication bus extends from the control board to the disk drive module through the mated electrical connectors. The processing unit of the control board communicates with the controller of the adapter board over the communication bus in accordance with a communication protocol in order to control operation of the disk drive.

10 Claims, 12 Drawing Sheets

U.S. PATENT DOCUMENTS

| | | |
|---|---|---|
| 6,831,831 B2 | 12/2004 | Bicknell et al. |
| 6,850,410 B2 | 2/2005 | Peeke et al. |
| 7,145,776 B2 | 12/2006 | King, Jr. et al. |
| 2002/0044562 A1 | 4/2002 | Killen, Jr. et al. |
| 2002/0046276 A1 | 4/2002 | Coffey et al. |
| 2002/0118685 A1 | 8/2002 | Linnell et al. |
| 2003/0084252 A1 | 5/2003 | Talagala |
| 2003/0145116 A1 | 7/2003 | Moroney et al. |
| 2004/0019709 A1 | 1/2004 | Bissessur et al. |
| 2004/0019711 A1 | 1/2004 | Bissessur et al. |
| 2004/0064638 A1 | 4/2004 | Chong, Jr. |
| 2004/0103327 A1 | 5/2004 | Dake et al. |
| 2004/0225816 A1* | 11/2004 | Leigh et al. .................. 710/305 |

OTHER PUBLICATIONS

Maxim, Selecting and Using RS-232, RS-422, and RS485 Serial Data Standards, Application Note 723, Dec. 29, 2000, pp. 1-9.*

Office Action dated Nov. 30, 2005 for U.S. Appl. 10/402,594; 19 pages.

Office Action dated Jan. 4, 2007 for U.S. Appl. No. 10/402,594; 22 pages.

Office Action dated Oct. 15, 2007 for U.S. Appl. No. 10/402,594; 15 pages.

Notice of Allowance dated Jan. 13, 2009 for U.S. Appl. No. 10/402,594; 4 pages.

Office Action dated Jun. 11, 2008 for U.S. Appl. No. 10/402,594; 8pages.

* cited by examiner (FC ADAPTER BOARD CONNECTOR
PINOUT TO MIDPLANE OR TO LCC)

(ATA ADAPTER BOARD CONNECTOR
PINOUT TO MIDPLANE OR TO LCC)

MIDPLANE-INDEPENDENT IMPLEMENTATIONS OF DATA STORAGE SYSTEM ENCLOSURES

RELATED APPLICATION

This application is a divisional application claiming the benefit of the filing date of co-pending U.S. patent application Ser. No. 10/402,594, filed Mar. 28, 2003, titled "Midplane-Independent Implementations of Data Storage System Enclosures," the entirety of which U.S. patent application is hereby incorporated by reference.

FIELD OF THE INVENTION

The invention relates generally to data storage systems. More particularly, the invention relates to midplane-independent implementations of data storage system enclosures.

BACKGROUND

The configuration of an enclosure in a data storage system, more specifically of the enclosure's components, such as its midplane, control boards and disk drive modules, is tied closely to the particular protocol or standard used to communicate between the control boards and the disk drives modules. Each type of protocol has its own signaling convention and unique set of signals, such as high-speed data, control and status signals. These signals travel over signal paths or traces on the midplane connecting the control boards to the disk drives modules. Typically, this midplane is designed or "tuned" to perform optimally with the control boards, disk drive modules, and signals unique to that protocol, a procedure that is laborious and open to error. As a result, enclosures in a data storage system are effectively fixed to the type of protocol being employed. For example, a midplane tuned for use in a Fibre Channel (FC) enclosure cannot be used in an Advanced Technology Attachment (ATA) enclosure operating according to the ATA standard, in a Gigabit Ethernet enclosure operating according to a 1 Gbps Ethernet standard, or in a Serial Attached SCSI (SAS) environment.

This close relationship between the protocol and the enclosure's midplane hinders users from changing an enclosure designed to operate according to one protocol to operate according to a different protocol. Whereas substituting new disk drive modules into the front slots of an enclosure and replacing control boards through the rear side of the enclosure are relatively easy to perform, replacing or retuning a midplane often requires the burdensome task of disassembling the enclosure itself. This laborious process discourages what should be a routine procedure, namely, updating an enclosure to operate at a faster speed, such as migrating from 1 Gbps Fibre Channel system to a 2 Gbps Fibre Channel system, because this change affects the tuning of the midplane. There remains, therefore, a need for a data storage system enclosure that is midplane-independent so that users can update or change the enclosure without incurring the above-described disadvantages.

SUMMARY

In one aspect, the invention features a midplane-less storage system comprising an enclosure including a control board having an electrical connector attached thereto and a processing unit. The enclosure also includes a disk drive module with a disk drive for storing data and an adapter board electrically connected to the disk drive. The adapter board has a controller and an electrical connector that is mated to the electrical connector of the control board. A communication bus extends from the control board to the disk drive module through the mated electrical connectors. The processing unit of the control board communicates with the controller of the adapter board over the communication bus in accordance with a communication protocol in order to control operation of the disk drive.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Managers of data storage systems having enclosures constructed in accordance with the invention can change or update the enclosures to operate according to a different standard or protocol without needing to disassemble the enclosure to replace or retune the midplane. In brief, changing an enclosure to operate according to a different protocol entails changing the disk drive modules and control boards, but not the midplane, if the enclosure even has one. This advantage derives from the designs of disk drive modules and control boards in the enclosure that enable the midplane to be independent of the protocol. In general, the same midplane can be used in a variety of environments that use low-voltage differential signaling technology. For example, the same midplane can be used in a Fibre Channel (FC) enclosure, in a serial Advanced Technology Attachment (SATA) enclosure, in a Gigabit Ethernet enclosure, and in a Serial Attached SCSI (SAS) environment. Conversely, the enclosure of the invention is independent of the midplane; namely, disk drive modules communicate with control boards in the enclosure irrespective of whether the enclosure has a midplane, as is illustrated by some embodiments described in more detail below.

Figure 1:
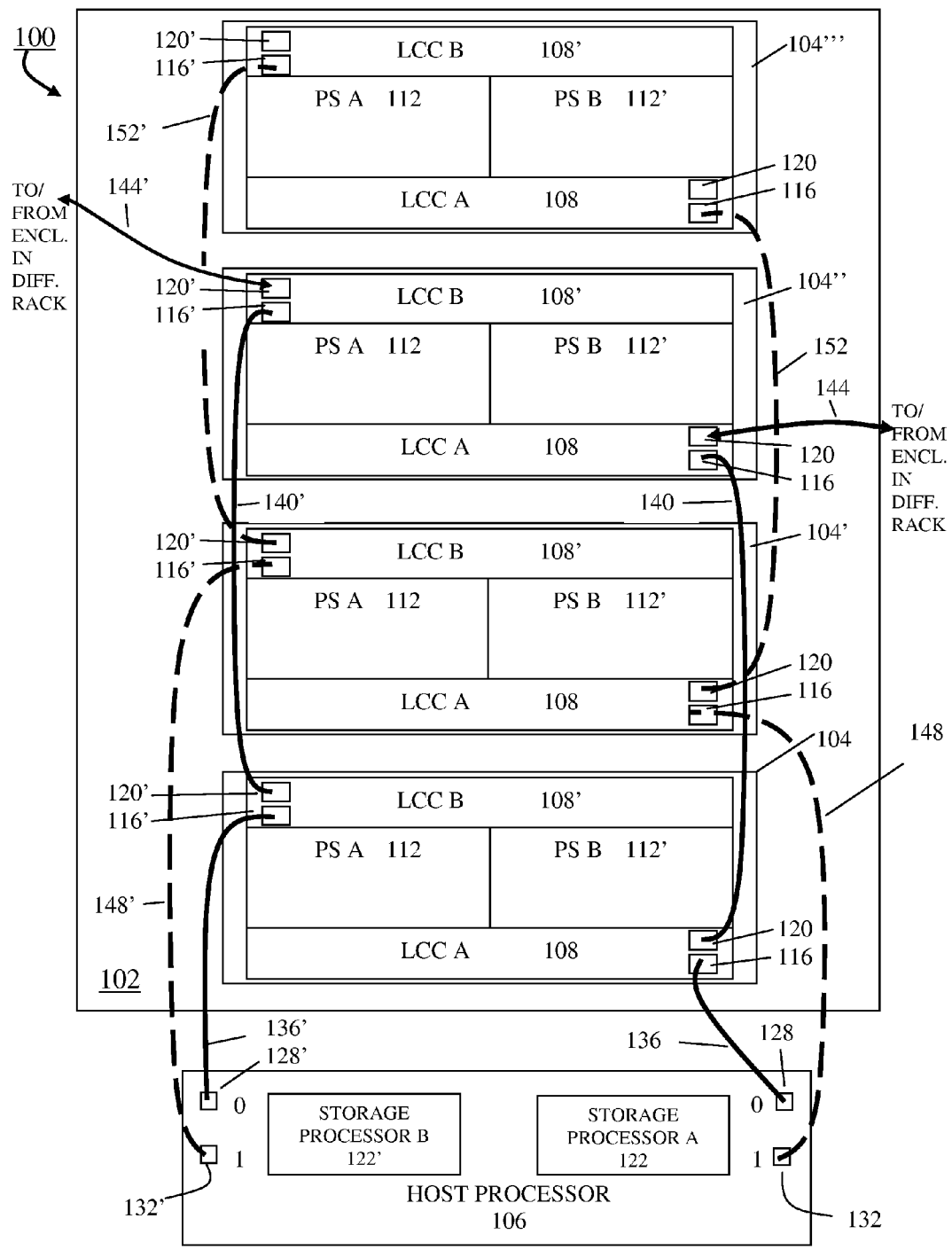
FIG. 1 is a block diagram of an embodiment of a data storage system constructed in accordance with the principles of the invention.

FIG. 1 shows a rear view of an embodiment of a data storage system 100 constructed in accordance with the invention. The storage system 100 includes a rack 102 of enclosures 104, 104', 104'', and 104''' (generally, enclosure 104) and a host processor enclosure 106. The enclosures 104 of the storage system 100 need not physically be in the same rack 102, but can be in separate racks. Also, although the host processor enclosure 106 is shown to be external to the rack 102, in some embodiments the rack 102 includes the host processor enclosure 106. A unique address is associated with each enclosure, referred to as an enclosure address. The host processor 106 sends a unique enclosure address to each enclosure 104. In brief overview, the host processor 106 sends a command that polls the LCCs 108, 108' of each enclosure 104. Each LCC 108, 108' of each enclosure 104 identifies itself in an aggregated response from the LCCs in the loop. From the response, the host processor 106 constructs a position table and sends a second command to the LCCs 108, 108' of each enclosure 104 that assigns the enclosure addresses (i.e., positions).

In general, each enclosure 104 is a storage device having a plurality of disk drive modules (not shown). Examples of storage devices include disk-array enclosures (DAE) and disk-array processor enclosures (DPE). A typical DAE includes a plurality of disk drive modules (e.g., fifteen), one or two link control cards (LCCs), and one or two power supplies. A typical DPE includes a plurality of disk drive modules (e.g., fifteen), one or two storage processors, each of which includes LCC functionality, and one or two power supplies. Disk drive modules include a carrier assembly that holds a disk drive and slides into slots at the front of the enclosure 104. Applications for the disk drive modules include, for example, JBOD (Just a Bunch Of Disks), RAID (Redundant Array of Independent Disks), SAN (Storage Area Network), and NAS (Networked Attached Storage).

In the illustrated embodiment, each enclosure 104 implements redundancy with an "A" side and a "B" side. Each side has a link control card (LCC) 108, 108' (generally, LCC 108) and a power supply (PS) 112, 112' (generally, PS 112). Reference numerals for the B-side components are the same as corresponding components on the A side with the addition of a prime (') designation. Each LCC 108, 108' includes a primary communications port 116, 116' (generally, primary port 116) and an expansion communications port 120, 120' (generally, expansion port 120). Although this embodiment is illustrated through the use of link control cards, it is to be understood that the principles of the invention apply to any enclosure card or board which performs a logic or control function and communicates with the other cards, processors or disk drive modules. One example is an ATA bridge control card (ATA BCC), which operates as a communications bridge between the host processor 106 and the disk drive modules.

The host processor enclosure 106 includes an A-side storage processor 122 and a B-side storage processor 122'. Each storage processor 122, 122' runs an operating system and uses the storage system 100 for data storage and retrieval. The storage system 100 communicates over a plurality of backend networks (also referred to as a backend). In general, a backend is a communication network by which the enclosures 104 and host processor 106 can exchange communications (e.g., commands, messages, data, etc.) with each other. Topologies for backend networks vary. In one embodiment, each backend has a loop topology. For example, communication signals traverse the loop in one direction and pass from enclosure 104' to enclosure 104''', in a daisy-chain fashion, and then return from enclosure 104''' to enclosure 104'. An enclosure receiving communication signals targeted for a different enclosure forwards those signals along the loop. The present invention can apply to backends of different topologies (e.g. token rings, Ethernet).

In the embodiment shown, the storage system 100 communicates over a plurality of redundant backends, and associates an identifier (or value), e.g., a loop ID, with each redundant backend. Note that as used herein a backend is a single network that connects a set of enclosures, and that a redundant backend is a plurality of separate backend networks that connect the same set of enclosures. Other embodiments of the storage system 100 are connected to at least eight backends. An embodiment of a storage system 100 implementing eight backends (numbered 0-7), for example, includes at least eight enclosures, each enclosure being connected to one of the eight backends.

Referring to the embodiment shown in FIG. 1, each storage processor 122, 122' is in communication with each of the enclosures 104 by the redundant backends. Communication over backend 0 is through communications ports 128, 128' and communication over backend 1 is through communications ports 132 and 132'. The labels 0 and 1 adjacent to the communications ports identify the backend with which that communications port is associated. The communications ports 128, 128', 132, 132' provide hardware pathways by which communication signals pass into and out of the host processor enclosure 106.

In general, each redundant backend includes redundant loops that include the host processor 106 and one or more enclosures 104. The above-described cables connecting the host processor 106 to the enclosures 104 implement the loops by including two unidirectional paths in opposite directions. In one embodiment, the loops are Fibre Channel arbitrated loops. Fibre Channel is a computer communications protocol for communicating data signals at a data rate of up to 2 Gbps. In general, the Fibre Channel protocol provides an interface by which host processors (and servers) communicate with enclosures and with the disk drive modules installed within the enclosures. The Fibre Channel arbitrated loop can support up to 126 nodes on the loop. In this embodiment, up to 120 disk drive modules and one storage processor are on the loop.

For the storage system 100 to be operational, the LCCs 108, 108' of an enclosure 104 need to be connected to the same redundant backend. As a representative example, if the primary port 116 of LCC 108 of the enclosure 104' is connected to the backend 0, then the primary port 116' of the LCC 108' of the enclosure 104' also needs to be connected to the backend 0. If the LCCs 108, 108' are connected to differently numbered backend loops, this mismatch is indicative of a system with an improperly connected cable. In one embodiment, the LCCs 108, 108' of each enclosure 104 execute software to confirm whether the LCCs 108, 108' of that enclosure are connected to the same backend loop numbers and have the same enclosure address, as described in more detail below in connection with FIG. 11.

More specifically, the redundant loops associated with redundant backend 0 include the host processor enclosure 106, the enclosures 104 and 104'', and one or more other enclosures located in a different rack. The cables 136, 136' connect communications ports 128, 128' to the respective primary port 116, 116' of the LCCs 108, 108' of the enclosure 104, cables 140, 140' connect the respective expansion port 120, 120' of the LCCs 108, 108' of the enclosure 104 to the respective primary port 116, 116' of the LCCs 108, 108' of the enclosure 104'', and cables 144, 144' connect the respective expansion port 120, 120' of the LCCs 108, 108' of the enclosure 104'' to the primary port of an external enclosure (not shown).

More specifically for redundant backend 1, the redundant loops include the host processor enclosure 106 and the enclosures 104' and 104'''. The cables 148, 148' connect the communications ports 132, 132' to the respective primary port 116, 116' of the LCCs 108, 108' of the enclosure 104' and cables 152, 152' connect the respective expansion port 120, 120' of the LCCs 108, 108' of the enclosure 104' to the respective primary port 116, 116' of the LCCs 108, 108' of the enclosure 104'''. These backends are illustrative only. The principles of the invention apply to backends that include more or fewer enclosures.

Figure 2:
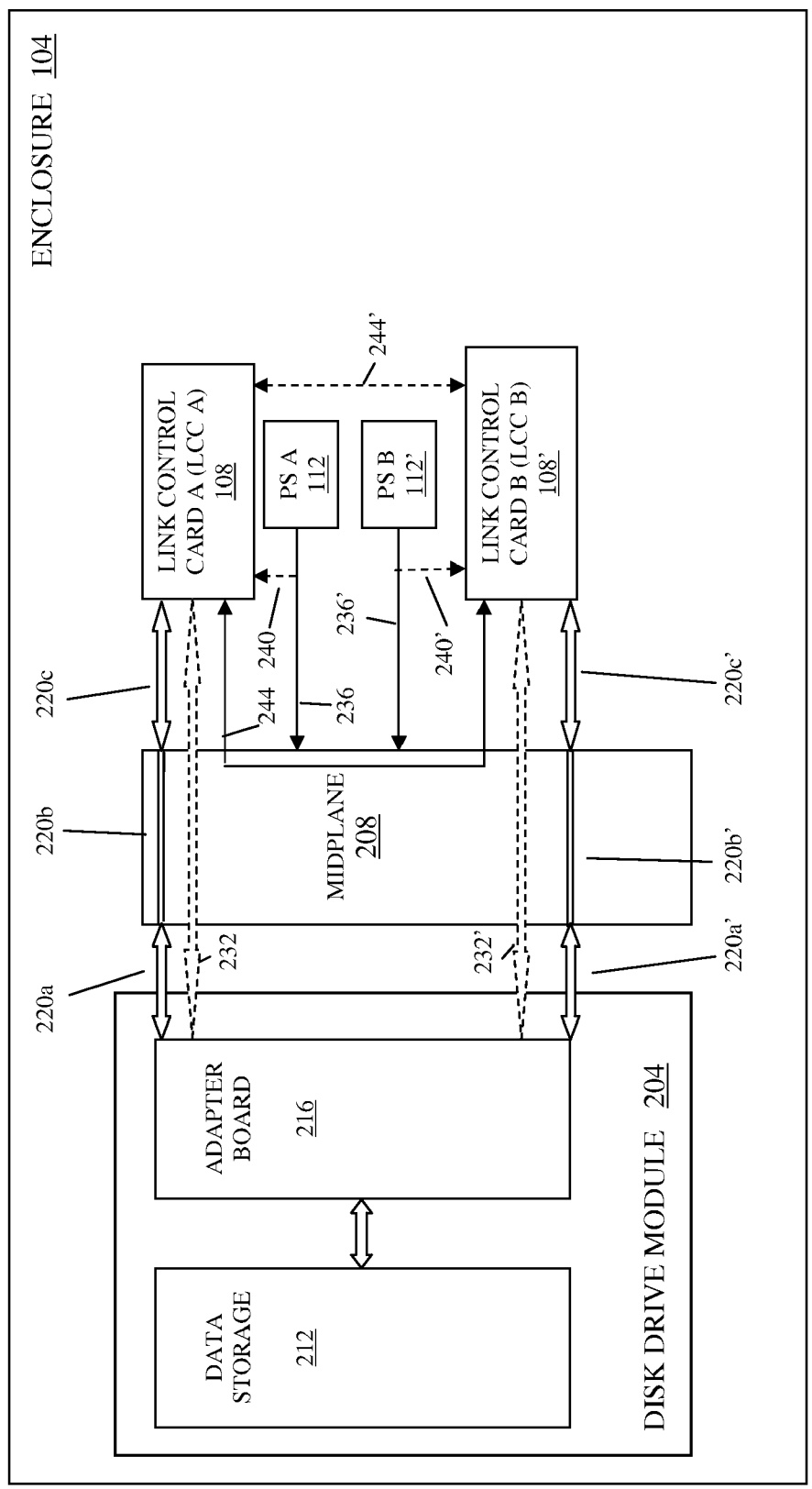
FIG. 2 is a block diagram of an embodiment of an enclosure in the data storage system of FIG. 1.

FIG. 2 shows an embodiment of the enclosure 104 of FIG. 1 constructed in accordance with the principles of the invention. The enclosure 104 has a disk drive module 204, the A-side LCC 108, the B-side LCC 108', the A-side power supply (PS A) 112, and the B-side power supply (PS B) 112'. Optionally, the enclosure 104 also includes a midplane 208. The disk drive module 204 includes data storage 212 in electrical communication an adapter board 216. Typically, the enclosure 104 has a plurality of disk drive modules (e.g., fifteen), but only one such module 204 is shown to illustrate the invention.

For embodiments having the midplane 208, the adapter board 216 is electrically connected to the LCCs 108, 108' by signal lines 220 and 220' (generally, signal lines 220), respectively. The signal lines 220 are represented in three sections: a first section 220a represents the electrical connections between the adapter board 216 and the midplane 208, a second section 220b represents the electrical connections through the midplane 208, and a third section 220c represents the electrical connections between the midplane 208 and the LCCs 108, 108'. For embodiments with the midplane 208, electrical signals communicated between the LCCs 108, 108' and the disk drive module 204 pass directly through the midplane 208 over signal lines 220. For midplane-less embodiments, the adapter board 216 is directly electrically connected to the LCCs 108, 108' by signal lines 232 and 232' (generally, signal lines 232), shown in phantom.

Also, the power supplies 112, 112' are in electrical communication with the midplane 208 through signal lines 236, 236', respectively. Electrical traces or paths on the midplane 208 distribute the power and other signals received from the power supplies 112, 112' to the signal lines 220a, for further distribution to the adapter board 216. For midplane-less embodiments, the power supplies 112, 112' are electrically connected to the respective LCC 108, 108' by signal lines 240, 240', respectively, and the power and other signals transmitted from the power supplies 112, 112' pass to the adapter board 216 over signal lines 232.

The signal lines 220, 220' (and signal lines 232, 232' for midplane-less embodiments) each include signal lines that embody a communication bus. As used herein, a communication bus means more than just the interconnecting wires or connector pins. The communication bus also includes the formats and procedures (i.e., protocol) for communicating across the wires. In one embodiment, the communication bus is a two-wire $I^2C$ (Inter IC) bus. In another embodiment, the communication bus is an RS-232 bus. A communication bus (e.g., a two-wire $I^2C$ bus) is also used for communications between the LCCs 108. In one embodiment, signal lines 244, which include this inter-LCC communication bus, pass over or through the midplane 208, as described in more detail in connection with FIG. 9A, FIG. 9B and FIG. 10. For midplane-less embodiments, the LCCs 108, 108' communicate over signal lines 244' (shown in phantom), which include the communication bus.

To read data from and write data to the data storage 212, the LCCs 108 issue commands or instructions to the adapter board 216 of the disk drive module 204 over the communication bus using the bus protocol. In response to such commands, the adapter board 216 sends signals to the data storage 212 using a protocol associated with communicating with one or more disk drives in the data storage 212. Thus, each LCC 108 and disk drive module 204 is capable of communicating according to a first protocol or standard that enables communications on the communication bus (referred to as low-speed signaling) and according to a second protocol or standard that enables reading from and writing to the data storage 212 (referred to as a high-speed signaling).

Figure 3A:
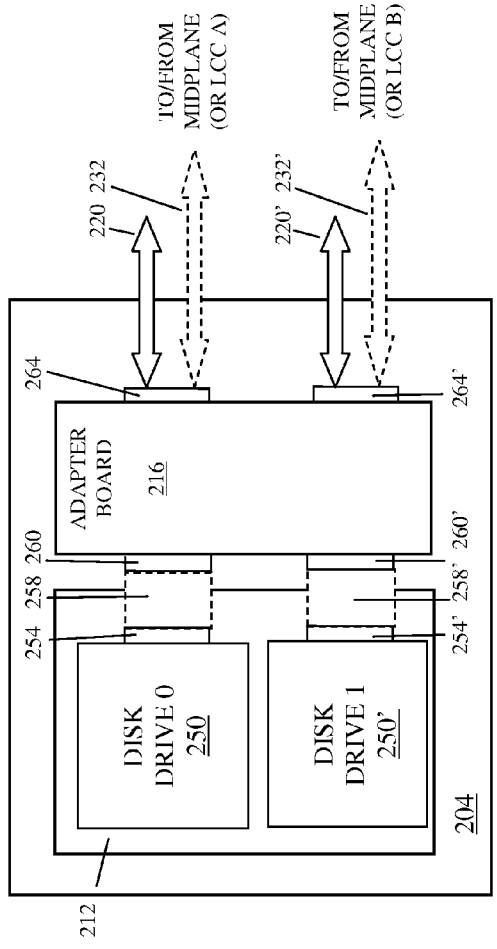
FIG. 3A is a block diagram of an embodiment of a disk drive module in the enclosure of FIG. 2, including data storage and an adapter board.

FIG. 3A shows an embodiment of the disk drive module 204 of FIG. 2, including the data storage 212 and the adapter board 216. The data storage 212 includes a pair of disk drives, Disk Drive 0 250 and Disk Drive 1 250' (generally, disk drive 250). In general, the disk drives 250 are of a type that employs low-voltage differential signaling for transmitting and receiving data. In one embodiment, each disk drive 250 is a serial Advanced Technology Attachment (SATA) disk drive. In another embodiment, the disk drives 250 are Fibre Channel (FC) disk drives. In yet another embodiment, the disk drives 250 are Serial Attached SCSI (SAS) disk drives. Disk drive modules with more than two disk drives or with other types of disk drives than those described can be used without departing from the principles of the invention.

Each disk drive 250, 250' has an electrical disk drive connector 254, 254', respectively, for mating with a corresponding electrical connector 260, 260' on the adapter board 216. In one embodiment, flexible cables 258, 258' (shown in dashed lines) connect the disk drive connectors 254, 254' to the respective adapter board connectors 260, 260'. The flexible cables 258, 258' are substantially equal to each other in length so that the distances traveled by electrical signals between each disk drive 250, 250' and the adapter board 216 are approximately the same. Although the disk drives 250, 250' appear side-by-side in FIG. 3A, in some embodiments, one of the disk drives 250, 250' is mounted closer to the adapter board 216 than the other. The cables 258, 258' ensure that electrical distances between each disk drive 250, 250' and the adapter board 216 are substantially the same. The flexibility of the cables permits folding and bending to use up any slack resulting from being connected to the disk drive that is closer to the adapter board 216.

The adapter board 216 also has a plurality of midplane connectors 264, 264' (generally, midplane connector 264). In general, there is one midplane connector 264 for each LCC 108 in the enclosure 104. For embodiments with the midplane 208, each midplane connector 264 mates with a corresponding connector on the midplane 208 (see FIG. 7). In FIG. 2, these connections are represented by section 220a, 220a' of the respective signal lines 220, 220'. For midplane-less embodiments, each midplane connector 264 mates with an electrical connector on one of the LCCs 108, 108' (see FIG. 8). In FIG. 2, these connections are represented by signal lines 232, 232'. Although the midplane connectors 264, 264' are not connecting to a midplane in this instance, the connectors are referred to as such to distinguish from the various other connectors used in the enclosure 104. The midplane connectors 264, 264' are described in further detail below in connection with FIG. 4.

Figure 3B:
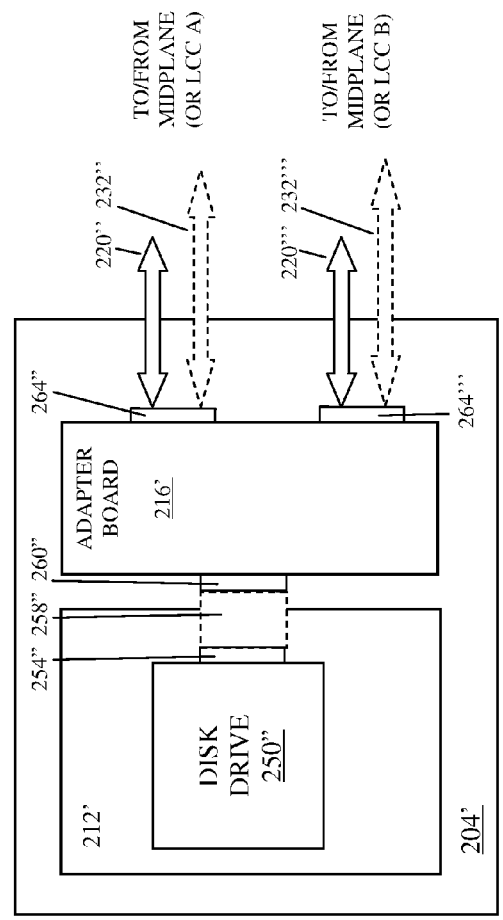
FIG. 3B is a block diagram of another embodiment of a disk drive module that can be used in the enclosure of FIG. 2.

FIG. 3B shows another embodiment of a disk drive module 204' that can be used in the enclosure 104 of FIG. 2. The disk drive module 204' differs from the disk drive module 204 of FIG. 3A by having data storage 212' comprising only one disk drive 250". Like the disk drives 250, 250' of FIG. 3A, the disk drive 250" can be one of a variety of disk drive types, such as a FC, an ATA, or an SAS disk drive. The disk drive connector 254" can connect directly to the connector 260" of the adapter board 216' or through a flexible cable 258". Like the adapter board 216 of FIG. 3A, the adapter board 216' has two midplane connectors 264", 264'" for connecting to either the midplane 208 or to the LCCs 108, 108'.

Figure 4:
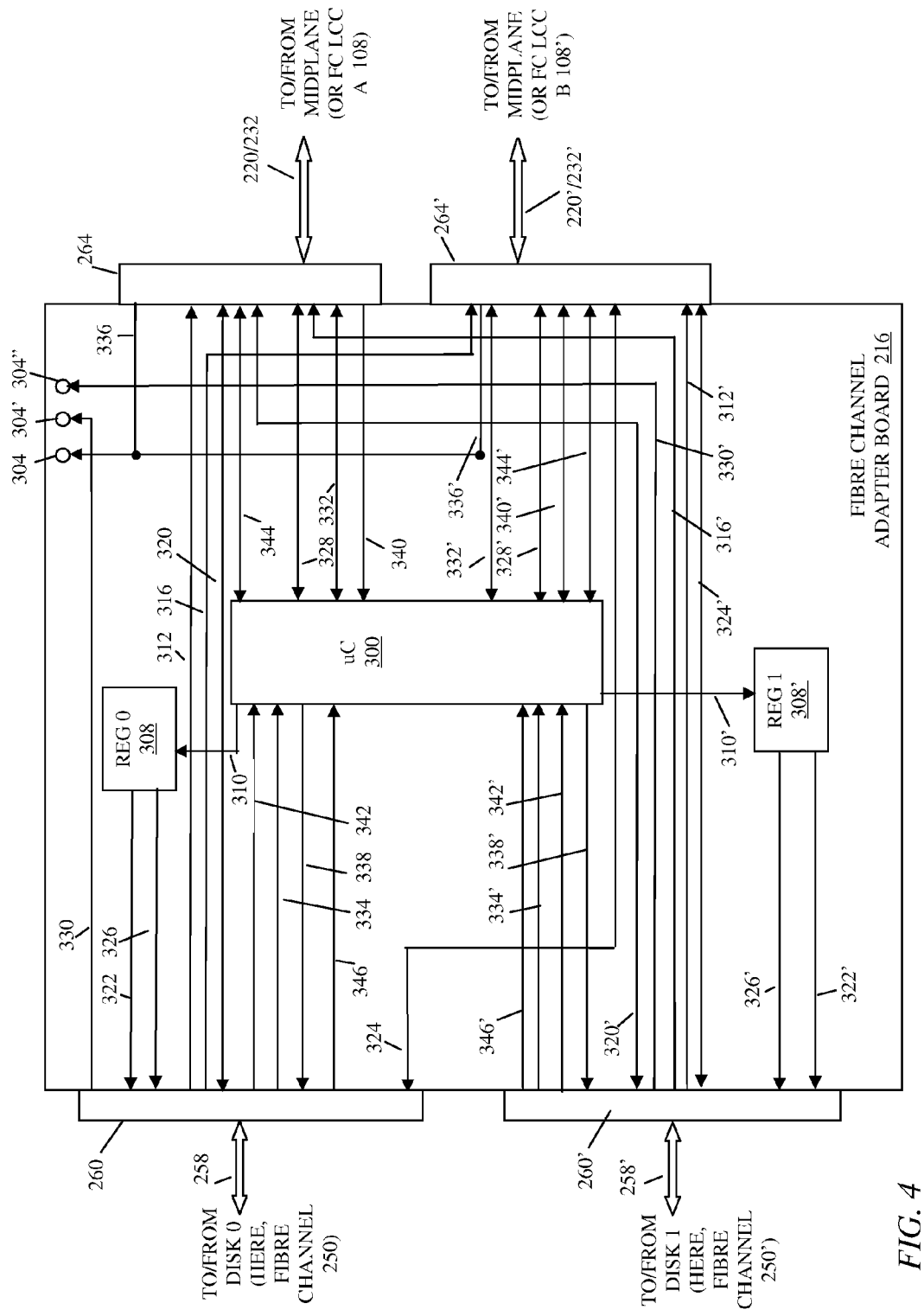
FIG. 4 is a block diagram of an embodiment of the adapter board in the disk drive module of FIG. 3A.

FIG. 4 shows an embodiment of the adapter board 216 of FIG. 2. In this embodiment, the adapter board 216 provides an electrical interface between two FC disk drives, Disk Drive 0 250 and Disk Drive 1 250', and two FC LCCs 108. 108'. The adapter board 216 includes a controller 300, a plurality of light-emitting diodes 304, 304', 304", and a plurality of registers 308, 308' (generally, register 308). The controller 300 is an electronic component such as an ASIC (application specific integrated circuit) or a PLD (programmable logic device). The controller 300 is in electrical communication with each register 308, 308' by signal lines 310, 310', respectively. In this embodiment, the registers 308 provide additional signal lines for communicating with the FC disk drives 250. In some embodiments in which the controller 300 has a sufficient number of pins to accommodate the number of signal lines from the FC disk drives 250, the registers 308 are omitted.

In brief overview, the controller 300 and FC LCCs 108, 108' communicate with the FC disk drives 250, 250' through the electrical disk drive connectors 260, 260' (FIG. 3A). One disk drive connector 260 is in electrical communication with Disk Drive 0 250, the other 260' with Disk Drive 1 250'. More specifically, the registers 308, 308' are in electrical communication with disk drive connectors 260, 260', respectively, over signal lines 322 and signal lines 326 and the controller 300 is in electrical communication with the disk drive connectors 260, 260' over fault signal lines 334, 334', device control signal lines 338, 338', power down signal lines 342, 342', and drive-inserted signal lines 346, 346'. The disk drive connectors 260, 260' are also electrically connected to the midplane connectors 264, 264' by bypass Disk Drive 0 signal lines 312, 312', bypass Disk Drive 1 signal lines 316, 316', Disk Drive 0 high-speed data signal lines 320, 320', and Disk Drive 1 high-speed data signal lines 324, 324'.

Each disk drive connector 260, 260' includes the following pin descriptions (reference numerals for the disk drive connector 260' have the prime (') designation):
 a) two "start" signal lines 322, 322', for controlling the disk drives 250, 250', respectively, at power up in one of four modes: 1) do not start, 2) start immediately, 3) start based on ID, 4) start on SCSI command;
 b) two bypass signal lines 312, 316 (312' and 316' for disk drive connector 260'); (When appropriate, the Disk Drive 0 250 issues a bypass disk drive 0 signal over either or both bypass signal lines 312, 316: the bypass signal line 312 conducts a bypass disk drive 0 signal to the midplane connector 264 for sending to the FC LCC A 108 and the bypass signal line 316 conducts a bypass disk drive 0 signal to the midplane connector 264' for sending to the FC LCC B 108'. The Disk Drive 1 250' issues a bypass disk drive 1 signal over either or both bypass signal lines 312', 316': the bypass signal line 312' conducts a bypass disk drive 1 signal to the midplane connector 264' for sending to the FC LCC B 108' and the bypass signal line 316' conducts a bypass disk drive 1 signal to the midplane connector 264 for sending to the FC LCC A 108.)
 c) four high-speed data signal lines 320, 320', 324, 324' for exchanging FC data with the FC LCCs 108, 108'; (Signal lines 320 carry FC data between the Disk Drive 0 250 and the FC LCC A 108, signal lines 324 carry FC data between the Disk Drive 0 250 and the FC LCC B 108'. Similarly, signal lines 320' carry FC data between the Disk Drive 1 250' and the FC LCC A 108, and signal lines 324' carry FC data between the Disk Drive 1 250' and the FC LCC B 108'.)
 d) seven "sel_ID" signal lines 326, 326', for indicating the Arbitrated Loop Physical Address (ALPA) of the disk drive 250, 250', respectively;
 e) an "activity" signal line 330, 330', each of which is connected to an LED 304, 304', respectively;
 f) a fault signal line 334, 334';
 g) three device control signal lines 338, 338';
 h) a power down signal line 342, 342'; and
 i) a drive inserted signal line 346, 346'.

The FC disk drives 250 and controller 300 communicate with the midplane 208 or directly with the FC LCCs 108 through the midplane connectors 264 (FIG. 3A). More specifically, the controller 300 is in electrical communication with the midplane connectors 264, 264' over signal lines 328, 328', 332, 332', 340, 340', 344, 344'. Each midplane connector 264, 264' includes the following pin descriptions (reference numerals for the midplane connector 264' have the prime (') designation):
 a) two bypass disk drive signal lines 312, 316' (312' and 316 for midplane connector 264'), which are described above;
 b) four high-speed data signal lines 320, 320' for exchanging data between the respective disk drive 250, 250' and the FC LCC A 108;
 c) four high-speed data signal lines 324, 324' for exchanging data between the respective disk drive 250, 250' and the FC LCC B 108';
 d) a spare signal line 328, 328';
 e) an interrupt signal line 332, 332';
 f) a fault signal line 336, 336', both of which are connected to the LED 304, and either of which can activate the LED 304 when one of the FC LCCs asserts a fault signal;
 g) a reset signal line 340, 340'; and
 h) the communication bus 344, 344' described above in FIG. 2, here a 2-wire $I^2C$ bus.

On an $I^2C$ bus, some devices are master devices and other devices are slave devices, and each device is given an address. In this embodiment, the communication bus 344 is an $I^2C$ serial bus, and a processing unit 548 (FIG. 8) of the LCC A 108 (as a representative example of the LCCs 108) operates as a master device and the controller 300 operates a slave device. During operation of the enclosure 104, the processing unit 548 of the LCC A 108 sends commands to the controller 300 of the adapter board 216 over the $I^2C$ communication bus 344.

The controller 300 executes code that identifies and responds to the commands. For example, the controller can receive a command over the I²C bus 344 to position the FC disk drive 250 at a different ALPA. In response to receiving this command, the controller 300 changes the signals on the SEL_ID signal lines 326 to correspond to the different address. As another example, the controller 300 can receive another command over the I²C bus 344 to shut down the FC disk drive 250. In response, the controller 300 asserts the power down signal line 342 to halt the drive 250.

Figure 5:
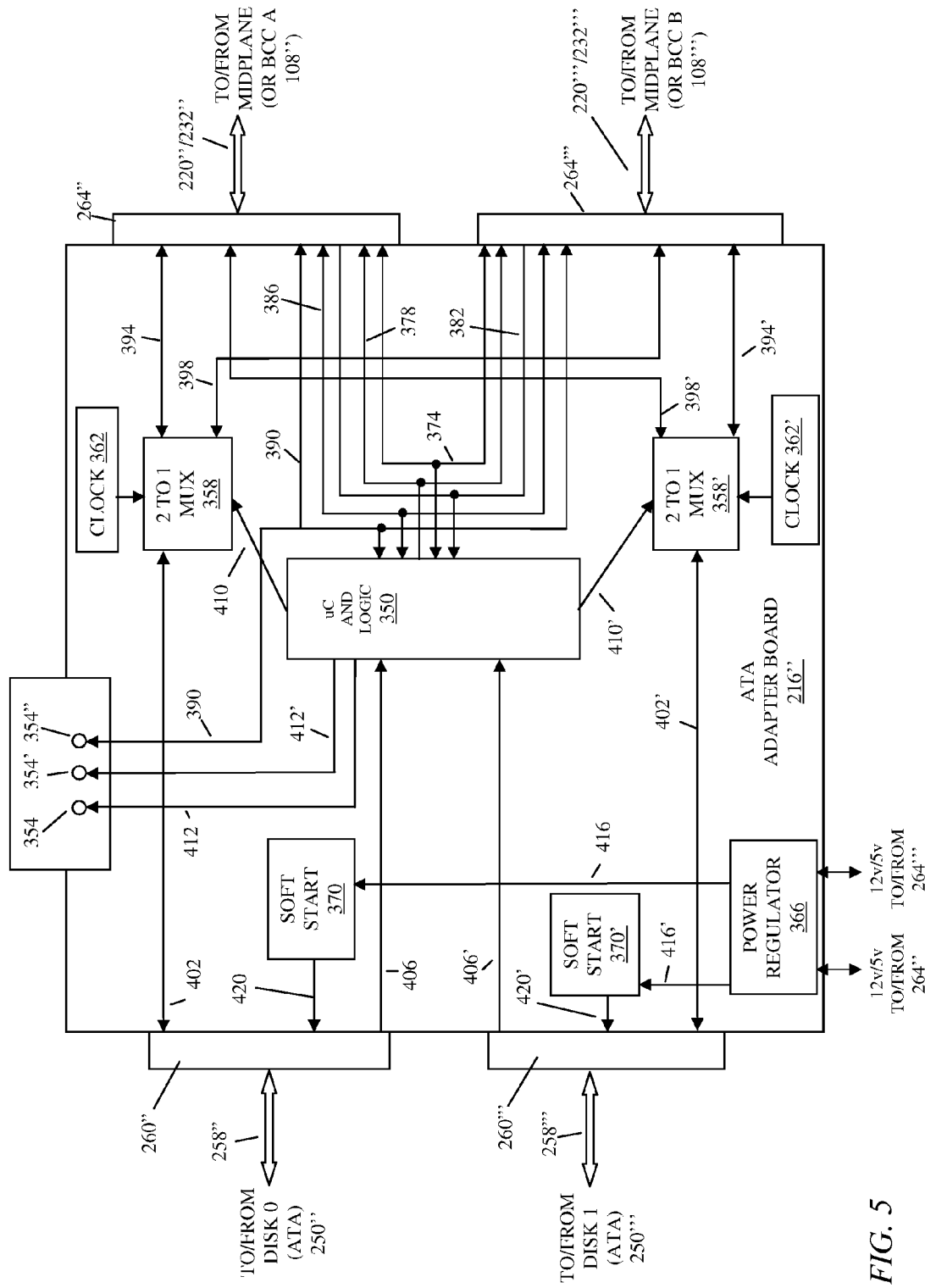
FIG. 5 is a block diagram of another embodiment of an adapter board that can be used in the disk drive module of FIG. 3A.

FIG. 5 shows another embodiment of an adapter board 216" for use in an ATA disk drive module and in an ATA enclosure. The adapter board 216" is designed to provide an electrical interface between two ATA disk drives 250", 250''', each of which is a single port device, and two ATA BCCs 108", 108'''. The adapter board 216" includes a controller and logic 350 (hereafter, controller 350), a plurality of light-emitting diodes 354, 354', 354", a plurality of multiplexers (MUXes) 358, 358', clocks 362, 362', power regulation circuitry 366, and soft start circuitry 370, 370'. The controller 350 is an electronic component, such as an ASIC (application specific integrated circuit) or a PLD (programmable logic device).

The controller 350 is in electrical communication with each ATA BCC 108", 108''' over request signal lines 382 for receiving request signals and over grant signal lines 378 for sending grant signals to the ATA BCCs 108", 108'''. Through the use of request and grant signals, the controller 350 arbitrates between the ATA BCCs 108", 108''' to determine which ATA BCC can currently communicate with each ATA disk drive 250", 250'''.

The controller 350 is also in electrical communication with the multiplexers (MUX) 358, 358' by signal lines 410, 410', respectively. Each MUX 358, 358' is a 2-to-1 multiplexer and is associated with one of the disk drives 250", 250'''. Using MUX 358 as an illustrative example, one input terminal of the MUX 358 receives serial ATA communications from the ATA BCC A 108" over signal line 394 and a second input terminal receives serial ATA communications with the ATA BCC B 108''' over signal line 398'. The controller 350 controls which ATA BCC communicates with the ATA Disk Drive 0 250" by sending a select signal to the MUX 358 over signal lines 410. In response to the select signal, the MUX 358 enables a communication path between the selected one of the ATA BCCs and the ATA Disk Drive 0 250". The MUX 358 recreates the serial ATA communications of the selected ATA BCC with a new clock (provided by the clock 362) and passes the recreated serial ATA communications to the Disk Drive 0 250" over signals line 402.

The controller 350 also includes non-volatile memory (not shown) for storing information, such as data and software code. Code executing on the controller 350 produces an activity output signal for each ATA disk drive 250", 250'''. One output terminal of the controller 350 is connected to the LED 354 by signal line 412 and another is connected to the LED 354' by signal line 412'. As an example, when the controller 350 generates the activity output signal for Disk Drive 0 250", the activity output signal activates the LED 354.

Power passes from the power supplies 112, 112' (FIG. 2) to the power regulator 366 through the connectors 264", 264'''. The power regulator 366 delivers 12v and 5v supplies to the soft start circuitry 370, 370' over power supply lines 416, 416', respectively. Each soft start circuitry 370, 370' controls the ramp rate of voltage supplied to the respective ATA disk drive when the ATA disk drive module is inserted into the enclosure slot and plugged into the midplane 208 or connected directly to the ATA BCCs 108", 108'''. By controlling the ramp rate, the soft start circuitry 370, 370' controls the instantaneous current drawn by the ATA disk drive module when plugged into a powered midplane 208, thus avoiding a voltage drop on the midplane 208. This "soft-start" feature enables the ATA disk drive module to be hot-plugged into an enclosure slot.

In brief overview, the controller 350 and ATA BCCs 108", 108''' communicate with the ATA disk drives 250", 250''' through the electrical disk drive connectors 260", 260'''. One disk drive connector 260" is in electrical communication with Disk Drive 0 250", and the other disk drive connector 260''' with Disk Drive 1 250'''. More specifically, the controller 350 is in electrical communication with ATA disk drive connectors 260", 260''' over drive-inserted signal lines 406, 406', the MUXes 358, 358' are in electrical communication with the ATA disk drive connectors 260", 260''' over serial ATA data signal lines 402, 402', respectively, and the soft start circuitry 370, 370' is in electrical communication with the ATA disk drive connectors 260", 260''' over power input signal lines 420, 420', respectively.

Each disk drive connector 260", 260''' includes the following pin descriptions (reference numerals for the disk drive connector 260''' have the prime (') designation):

a) a serial ATA data signal line 402, 402';
b) a drive inserted signal line 406, 406'; and
c) a power input signal line 420, 420'.

The adapter board 216" also has two midplane connectors 264", 264''' through which the ATA disk drives 250", 250''' and the controller 350 communicate with the ATA BCCs 108", 108''' directly or through the midplane 208. More specifically, the controller 350 is in electrical communication with midplane connectors 264", 264''' over a communication bus 374, grant signal lines 378, request signal lines 382, spare signal lines 386, and fault signal lines 390, and the MUXes 358, 358' are in electrical communication with the midplane connector 264" over serial ATA data signal lines 394, 394', respectively, and with the midplane connector 264''' over serial ATA data signal lines 398, 398', respectively. Each connector 264", 264''' includes the following pin descriptions (reference numerals for the connector 264''' have the prime (') designation):

a) four data signal lines 394, 394' for exchanging serial ATA data between the respective MUX 358, 358' and respective ATA BCC 108", 108''';
b) four data signal lines 398, 398' for exchanging serial ATA data between the respective MUX 358, 358' and respective ATA BCC 108", 108''';
c) two data signals providing a communication bus 374 (in one embodiment, a two-wire I²C bus) between the controller 350 and the respective ATA BCC 108", 108''';
d) two grant signal lines 378;
e) two request signal lines 382;
f) a spare signal line 386;
g) a fault signal line 390;
h) an interrupt line; and
i) a reset line.

Figure 6A:
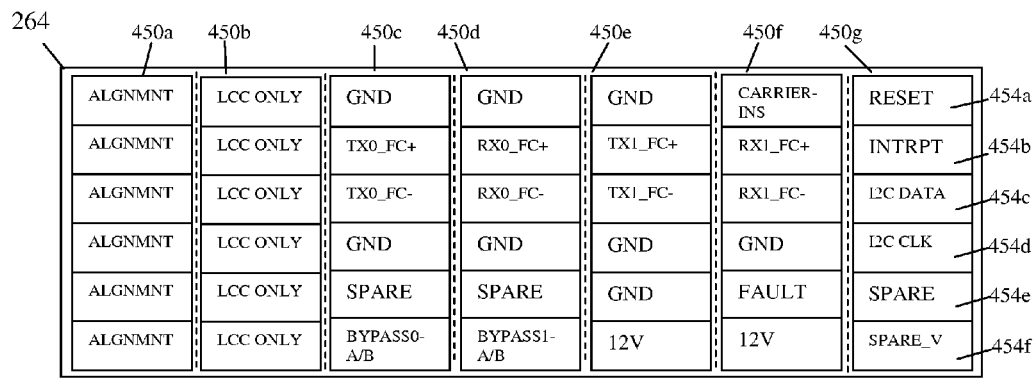
FIG. 6A is a block diagram illustrating a pin layout of an electrical connector of the Fibre Channel (FC) adapter board of FIG. 4, for connecting to the midplane or to one of the FC LCCs.

FIG. 6A shows an exemplary signal-to-pin definition (hereafter, pin layout) for the midplane connector 264 of the FC adapter board 216 of FIG. 4. For signals to pass directly through the midplane 208 or to the LCCs 108, the pin layout is the same for the LCC connectors 512 (see FIG. 7) on the midplane 208 and for the electrical connectors 544 (see FIG. 8) on the LCCs 108. The midplane connector 264' has the same pin layout as the midplane connector 264. When the disk drive module 204 is connected to the midplane 208, or to the FC LCCs 108, the midplane connector 264' is in an inverted position with respect to the midplane connector 264. Accordingly, from the perspective of the adapter board 216, the midplane 208, and LCCs 108, the pin layout for the midplane connector 264' is inverted to that shown in FIG. 6A.

The midplane connector 264 has a plurality of connector blades 450a, 450b, 450c, 450d, 450e, 450f, and 450g (generally, blade 450). Dashed lines delineate the blades 450 in the figure. Each connector blade 450 has a plurality of pins or contacts 454a, 454b, 454c, 454d, 454e, 454f (generally, pin 454). The pins 454 of the blade 450a are alignment pins used for aligning the midplane connector 264 with a corresponding connector on the midplane 208 or on the FC LCC 108. Each pin 454 of the blade 450b is defined for inter-LCC communication use only (i.e., "LCC only"). Such pins 454 are not used to communicate with the adapter board 216. The pins 454 of the remaining blades 450c, 450d, 450e, 450f, and 450g carry voltages and signals related to FC communication or are spares.

Figure 6B:
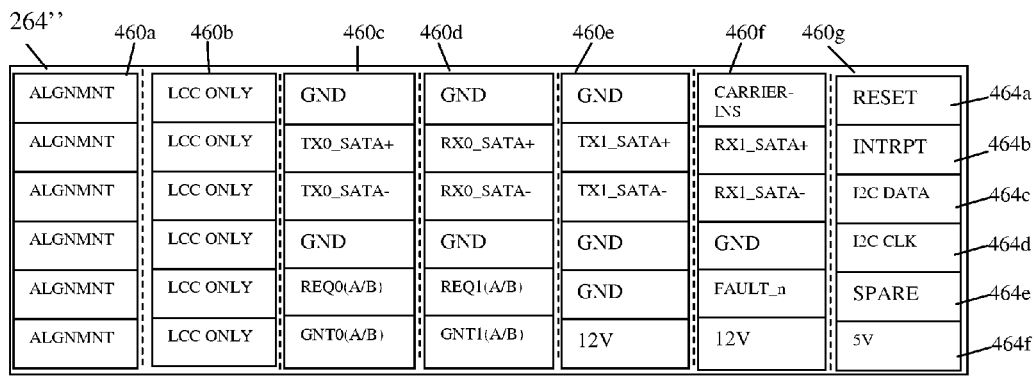
FIG. 6B is a block diagram illustrating a pin layout of an electrical connector of the Advanced Technology Attachment (ATA) adapter board of FIG. 5, for connecting to the midplane or to one of the ATA BCCs.

FIG. 6B shows an exemplary pin layout for the midplane connector 264" of the ATA adapter board 216" of FIG. 5. The midplane connector 264'" has the same pin layout as the midplane connector 264' (which is in an inverted orientation on the adapter board 216"). The midplane connector 264" has a plurality of connector blades 460a, 460b, 460c, 460d, 460e, 460f, and 460g (generally, blade 460). Dashed lines delineate the blades 460. Each connector blade 460 has a plurality of pins or contacts 464a, 464b, 464c, 464d, 464e, and 464f (generally, pin 464).

The pins 464 of the blade 460a are alignment pins used for aligning the midplane connector 264" with a corresponding connector on the midplane 208 or on the ATA BCC. The pin layout for the ATA midplane connector 264" is similar to the pin layout shown for the FC midplane connector 264 in FIG. 6A. For example, the relative position of the blade 460a of alignment pins within the ATA midplane connector 264" corresponds to the relative position of the blade 450a of alignment pins within the FC midplane connector 264. Similarly, the relative position of the blade 460b of LCC-only pins within the ATA midplane connector 264" corresponds to the relative position of the blade 450b of LCC-only pins within the FC midplane connector 264.

The pins 464 of the remaining blades 460c, 460d, 460e, 460f, and 460g, which carry voltages and signals related to ATA communication or are spares, are also in the same relative positions within the ATA midplane connector 264" and in the same relative positions within each blade 460 as the corresponding pins 454 of the blades 450c, 450d, 450e, 450f, and 450g of the FC midplane connector 264. For example, the pin 464d of the blade 460g of the ATA midplane connector 264" carries the I²C clk signal; the corresponding position in the FC midplane connector 264 is pin 454d of the blade 450g, and this pin 454d is defined to carry the I²C clk signal. As another example, the pin 464b of the blade 460c of the ATA midplane connector 264" carries a transmit serial ATA data signal from disk drive 0 (Tx0_SATA+); the corresponding position in the FC midplane connector 264 is pin 454b of the blade 450c, which is defined to carry a transmit FC data signal from disk drive 0 (Tx0_FC+).

Figure 7:
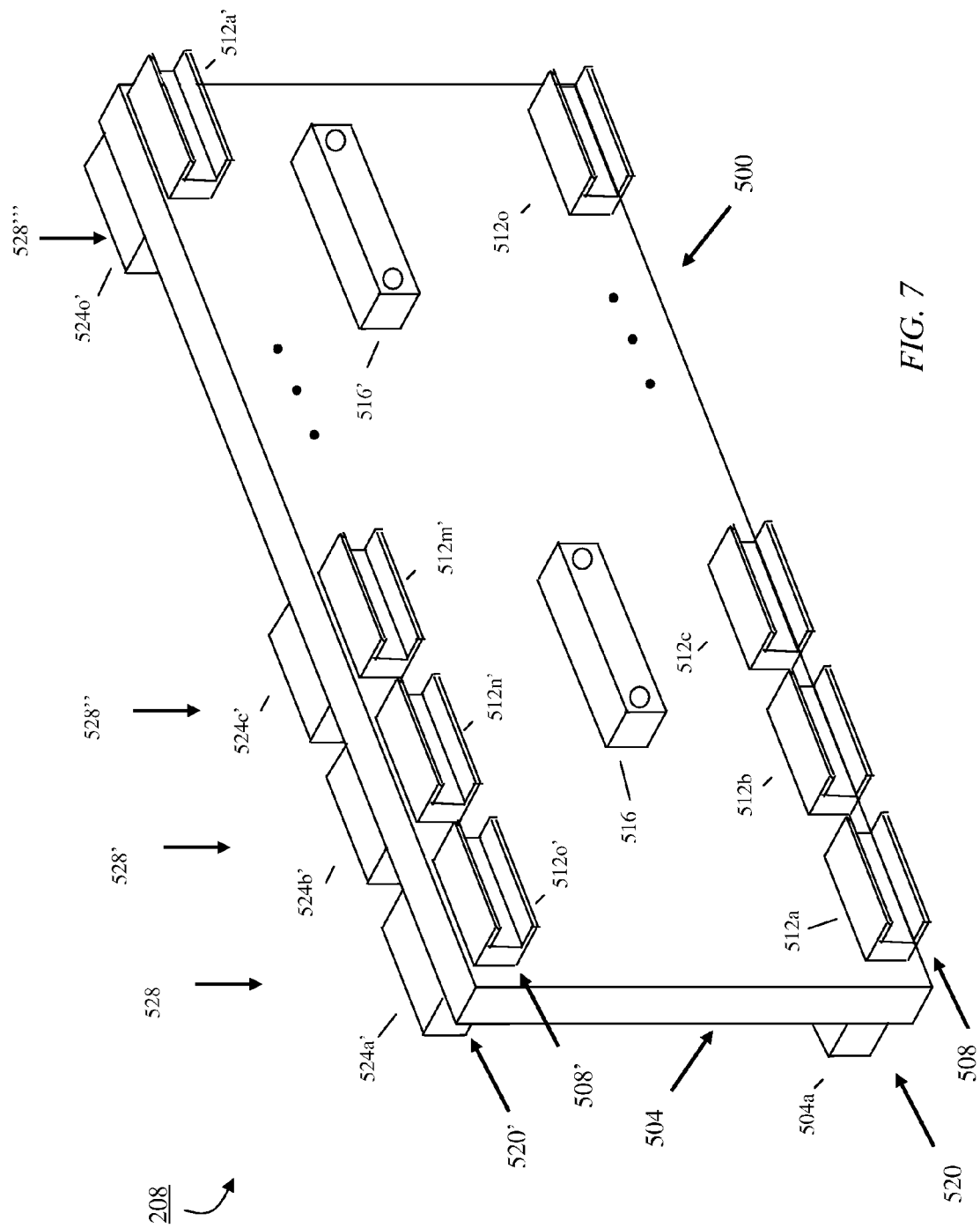
FIG. 7 is an isometric view of an embodiment of a midplane that can be used in the enclosure of FIG. 2.

FIG. 7 shows an embodiment of the optional midplane 208 of FIG. 2. In brief overview, the midplane 208 is usable with a variety of signaling technologies because the midplane 208 is not tuned or customized to any one signaling technology in particular. As described below, the only electrical paths on the midplane 208 that carry signaling-technology-specific signals pass directly through the midplane 208.

More specifically, the midplane 208 has a first side 500 that interfaces the LCCs (or BCCs) 108, 108' and a second side 504 that interfaces at least one disk drive module. Attached to a surface on the first side 500, the midplane 208 has a plurality of rows 508, 508' of electrical connectors (generally, row 508). In one embodiment, the connectors have pins that mount in through-holes. The through-holes pass completely through the midplane 208, from the first side 500 to the second side 504, and each through-hole is sufficiently large to receive two connector pins.

As shown, the row 508 includes electrical connectors 512a, 512b, 512c, and 512o, and the row 508' includes electrical connectors 512o', 512n', 512m', and 512a'. (The connectors of rows 508, 508' are vertically aligned, e.g., connectors 512a is aligned with connector 512o', and connector 512b is aligned with 512n'.) Hereafter, these electrical connectors are generally referred to as LCC connectors 512. In this embodiment, each row 508 has 15 LCC connectors, although only four LCC connectors 512 per row are shown in FIG. 7 to simplify the illustration of the midplane 208. The principles of the invention apply to midplanes with fewer (e.g., one) or more than fifteen electrical connectors per row. All of the LCC connectors 512 in one row 508 are aligned to mate with corresponding electrical connectors on one LCC 108.

The first side 500 also includes a pair of power supply connectors 516, 516'. Each power supply connector 516, 516' connects to one of the power supplies 112, 112' (FIG. 1), e.g., power supply connector 516 electrically connects power supply 112 to the midplane 208 and power supply connector 516' electrically connects power supply 112' to the midplane 208. Electrical traces or electrical paths (not shown) electrically connect each power supply connector 516, 516' to each of the LCC connectors 512 in each rows 508. By these traces, the power supplied by both power supplies 112, 112' is redundantly distributed to each LCC connector 512 on the first side 500 of the midplane 208.

The second side 504 of the midplane 208 also has a plurality of rows 520, 520' of electrical connectors (generally, row 520). As shown, the row 520' includes electrical connectors 524a', 524b', 524c', and 524d'. The row 520 has corresponding electrical connectors, but only electrical connector 524 is visible (i.e., not obscured by the midplane 208). Hereafter these electrical connectors are generally called module connectors 524. Each module connector 524 of row 520 is vertically aligned with a corresponding module connector 524 of row 520'. Columns 528, 528', 528", and 528'" (generally, column 528) show aligned module connectors, (e.g., connectors 524a and 524a'). Each column 528 of aligned module connectors 524 are for connecting to one disk drive module. For example, when connected to the disk drive module 204 of FIG. 3A, the module connectors 524a mates with the electrical connector 264 and the module connector 524a' mates with the electrical connector 264' on the adapter board 216 (FIG. 4).

Figure 9A:
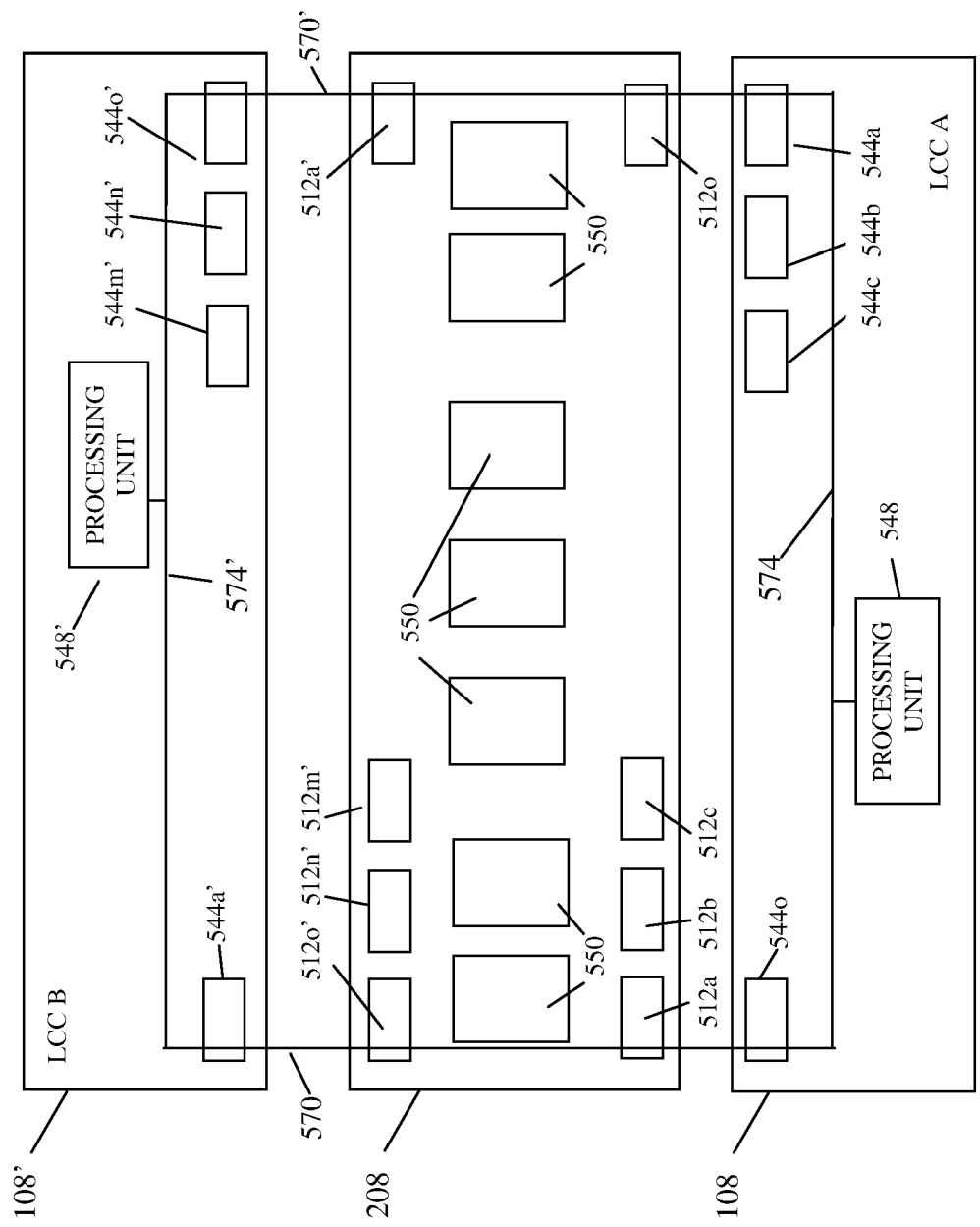
FIG. 9A is a conceptual diagram of the control cards of FIG. 8 in electrical communication with each other over a redundant connection formed by vertical traces on the midplane of FIG. 7 and horizontal traces on the LCCs.

Each row 520 of module connectors 524 is aligned with one of the rows 508 on the opposite, first side 500 of the midplane 208, and each module connector 524 is aligned with an LCC connector 512 directly opposite to it on the first side 500. Aligned module and LCC connectors 524, 512 share the same set of through-holes. Thus, each contact or pin of the LCC connector 512 is electrically connected to a corresponding contact or pin of the module connector 524 sharing the same through-hole. Consequently, electrical signals that are exchanged between each LCC (or BCC) 108, 108' and a respective disk drive module 204 pass directly through the midplane 208; that is, communications between the LCCs (or BCCs) and the adapter board 216 are not routed or distributed over electrical traces on the midplane 208, but pass directly through the midplane 208. Section 220b of signal lines 220 (FIG. 2) represents the electrical paths that are formed by the connection of the LCC and module connectors 512, 524 and pass through the midplane 208. These electrical paths are substantially equal in length (to each other); that is, the electrical distance from either LCC 108, 108' to any disk drive module installed in the enclosure is substantially the same, irrespective of which LCC 108, 108' or of which disk drive module is considered. This electrical distance is, in effect, the length of the electrical paths formed by the connected LCC and module connectors 512, 524. An advantage to having the communications between the LCCs 108, 108' and disk drive modules pass directly through the midplane 208 is that more area of the midplane 208 is available for other purposes (e.g., air passageways, inter-LCC communication, and power distribution). Another advantage, which is achieved by running vertical etches or traces on the midplane 208 to interconnect the LCCs 108, 108', described in more detail below in connection with FIG. 9A, is that fewer printed circuit board (PCB) layers are needed to construct the midplane 208. The fewer PCB layers ease the manufacture of the midplane 208 and reduce manufacturing costs.

Figure 8:
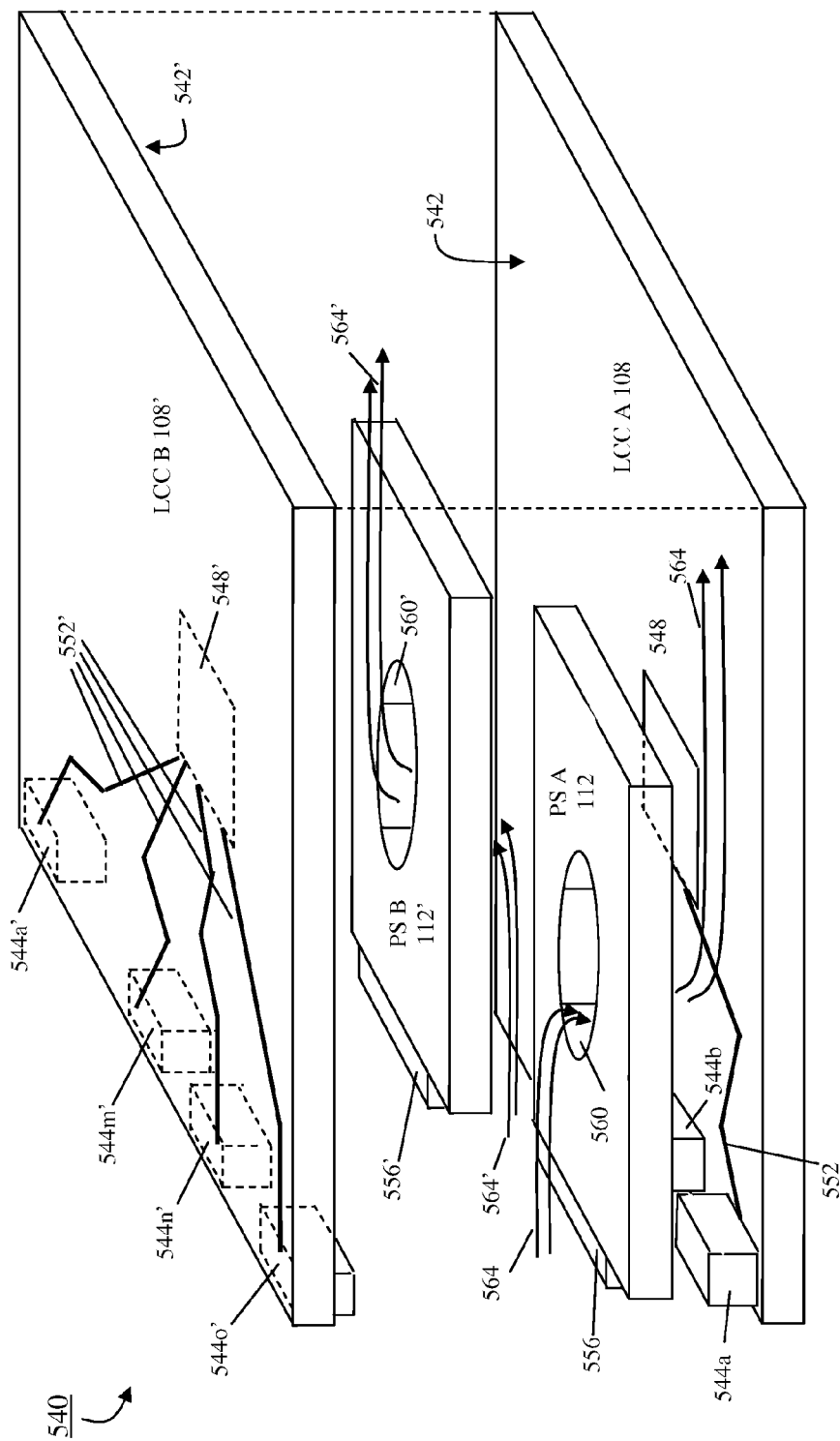
FIG. 8 is a side view of a plurality of control cards and power supplies that connect to the midplane of FIG. 7.

FIG. 8 shows an embodiment of a stacking arrangement 540 for the LCCs 108, 108' and power supplies 112, 112' within the enclosure 104 of FIG. 2. At the top of the stacking arrangement 540 is the LCC B 108'. As shown, attached to one side 542' of the LCC B 108' is a plurality of electrical connectors 544a', 544m', 544n', and 544o' (generally, 544'). The number of electrical connectors 544' corresponds to the number of disk drive modules that can be installed in the enclosure 104. Each electrical connector 544' mates with one of the LCC connectors 512' on the first side 500 of the midplane 208. There is one electrical connector 544' for each LCC connector 512' on the midplane 208. For embodiments without the midplane 208, each electrical connector 544' mates directly with the midplane connector 264' (FIG. 4) of a different disk drive module. In the stacking arrangement 540, the LCC B 108' board is in an inverted orientation; that is, side 542' faces in the direction of the other boards in the stacking arrangement 540.

On side 542', the LCC B 108' also has a processing unit 548' connected to each one of the electrical connectors 544' by an electrical trace or path 552'. Section 220c of signal lines 220 (FIG. 2) represent these electrical paths 552'. In one embodiment, the electrical paths 552' are substantially equal to each other in length. To achieve this path-length equality, the paths 552' to electrical connectors 544' that are close to the processing unit 548' are designed to be more tortuous (i.e., less straight or less direct) than those electrical connectors 544' that are physically further from the processing unit 548'. In effect, the processing unit 548' is substantially electrically equidistant to each of the electrical connectors 544'.

The LCC A 108 is disposed at the bottom of the stacking arrangement 540 within the enclosure 104 and has a plurality of electrical connectors 544a and 544b (generally, 544) attached to side 542. Other electrical connectors are not visible. Each electrical connector 544 has a corresponding electrical connector 544' on the LCC B 108'. Corresponding connectors 544, 544' are vertically aligned with each other in the stacking arrangement 540, and, in midplane-less embodiments, connect to the same disk drive module. For example, in FIG. 8 connectors 544o' and 544a are corresponding connectors. Again, the number of electrical connectors 544 corresponds to the number of disk drive modules that can be installed in the enclosure 104. Each electrical connector 544 mates with one of the LCC connectors 512 on the first side 500 of the midplane 208. For embodiments without the midplane 208, each electrical connector 544 mates directly with the midplane connector 264 (FIG. 4) of a different disk drive module.

Unlike the LCC B 108', the LCC A 108 is not in an inverted orientation when installed in the enclosure 104. As a result, the side 542 of LCC A 108 faces the direction of the side 542' of the LCC B 108'. Like the LCC B 108', the LCC A 108 has a processing unit 548 that is connected to each one of the electrical connectors 544 by electrical paths or traces 552. In addition to being substantially equal to each other in length, these electrical paths 552 are substantially equal in length to the electrical paths 552' on the LCC B 108'.

As can now be seen, the invention obviates tuning any of the adapter boards, control boards or midplane to compensate for disparate electrical distances between components of the enclosure. Tuning is unnecessary because disparate electrical distances are not present in the enclosure 104 of the invention. Electrical signals traveling from end-to-end between any LCC 108, 108' and any disk drive 250, 250' of any disk drive module travel the same electrical distance irrespective of their source and destination. This results from the equal distances between each processing unit of the LCCs 108, 108' and the midplane 208, between the midplane 208 and the adapter board 216 of each disk drive module 204 connected to the midplane 208, and between that adapter board 216 and each disk drive 250, 250' in the disk drive module 204.

The power supply 112' is disposed adjacent to one side 543' of the LCC B 108'. The power supply 112' has an edge connector 556' that mates with the power supply connector 516' of FIG. 7. (For midplane-less embodiments, the power supply connector 516' is attached to the side of the power supply 112' opposite and facing the LCC B 108', for connecting to a respective connector on the side 542 of the LCC B 108'. In this embodiment, electrical traces on the LCC B 108' distribute the power to each of the electrical connector 264' on the adapter board 216, through the electrical connectors 544'.) The power supply 112' has an air blower (not shown) and an opening 560' formed therein. The air blower causes cooling air to flow from the direction of the midplane 208 or disk drive modules 204 between the LCC B 108' and the power supply 112', through the opening 560' (as shown by arrows 564'). The direction of air flow thus circumvents the "ridge" of electrical connectors 544', which could otherwise impede the flow of cooling air.

The power supply 112 is disposed below the power supply 112' and above the LCC A 108. The power supply 112 has an edge connector 556 that mates with the power supply connector 516 of FIG. 7 (or to the LCC B 108, for midplane-less embodiments). The power supply 112 has an air blower (not shown) and an opening 560 formed therein. With respect to the power supply 112', the power supply 112 is in an inverted orientation. Thus, the air blower of the power supply 112 causes cooling air to flow from the direction of the midplane 208 or disk drive modules 204 over the electrical components on the surface of the LCC A 108, through the opening 560 (as shown by arrows 564) between the power supplies 112, 112'. The direction of air flow thus circumvents the "ridge" formed by the electrical connectors 544, which might otherwise impede the flow of cooling air.

As can be seen from FIG. 8, when the LCCs 108, 108' and power supplies 112, 112' are connected to the midplane 208, the midplane 208 can present an obstacle to the air flow. In one embodiment, shown in FIG. 9A, the midplane 208 has a plurality of openings 550 formed therein to permit the air flow produced by the blowers to pass from the disk drive module(s) 204 to the LCCs 108, 108'. (As a result of the pass-through nature of the midplane 208 achieved by the LCC and module connectors 512, 544 described above, the midplane 208 has fewer traces and, therefore, more useable area for placing openings 550 through which air can pass. Also, an advantage for using a two-wire communication bus (e.g., I²C) to communicate between the LCCs 108, 108' is that such a bus requires few traces on the midplane 208 and thus permits additional or larger openings 550 for air flow.) The openings 550 use a portion of the midplane 208, reducing the area of the midplane 208 that can be used for horizontal electrical traces (i.e., traces running east and west). Power traces to the LCC connectors 512 use some of the available area, and other area of the midplane 208 is needed for inter-LCC communications. One technique for achieving inter-LCC connections is to add additional layers to the midplane 208 to accommodate horizontal traces at those layers, but adding layers to the midplane 208 entails additional expense and complexity.

FIG. 9A shows another technique for achieving connections between the LCCs 108, 108' that does not use horizontal electrical traces on the midplane 208. The technique uses the printed circuit boards of the LCCs 108, 108' to provide horizontal electrical traces (e.g., traces 574, 574'). The technique also uses a first vertical electrical trace 570 and a second vertical trace 570' on the midplane 208. The vertical traces 570, 570' run perpendicularly to horizontal traces. In the example shown, the first vertical trace 570 connects a pin of the LCC connector 512a to a pin of the corresponding LCC connector 512o'. The second vertical trace 570' connects a pin of the LCC connector 512o to a pin of the corresponding LCC connector 512a'.

The first and second vertical traces 570, 570' are located on the midplane 208 to be symmetric with respect to the LCC connectors 512, 512' and with respect to connectors 544, 544' on the LCCs 108, 108'. For example, the first vertical trace 570 connects the leftmost connectors 512a and 512o', and to achieve symmetry, the second vertical trace 570' connects the rightmost connectors 512o, 512a'. As another example, when the first vertical trace 570 connects the second to leftmost connectors 512b, 512n', the second vertical trace 570' connects the second to rightmost connectors 512n, 512b' (not shown) to achieve symmetry. This symmetry enables use of the vertical traces 570, 570'.

When the LCCs 108, 108' are connected to the midplane 208, the vertical traces 570, 570' electrically connect unused pins of corresponding electrical connectors (e.g., 544o and 544a') through the mating connectors 512a, 544o and through the mating connectors 512o, 544a. An "unused pin" refers to a pin that is not used to communicate with the adapter board of a disk drive module, and thus is available for use in inter-LCC communications. As described above in FIG. 6A and in FIG. 6B, unused pins are identified as "LCC-only" pins. The position of each unused pin is such that, irrespective of whether the LCC is inverted or non-inverted, the unused pin aligns to connect to one of the vertical traces 570, 570' on the midplane 208.

Also, the first vertical trace 570 is electrically connected to the horizontal trace 574 on the LCC A 108 and the second vertical trace 570' is electrically connected to the horizontal trace 574' on LCC B 108'. The electrical connections between each vertical trace 570, 570' and each horizontal trace 574, 574' produces a redundant connection. For example, consider that the processing unit 548 is connected to the horizontal trace 574 on the LCC A 108 and that the processing unit 548' is connected to the horizontal trace 574' on the LCC B 108'. The redundant connection produced by the vertical 570, 570' and horizontal traces 574, 574' connects the processing unit 548 to the processing unit 548' by redundant electrical paths.

Figure 9B:
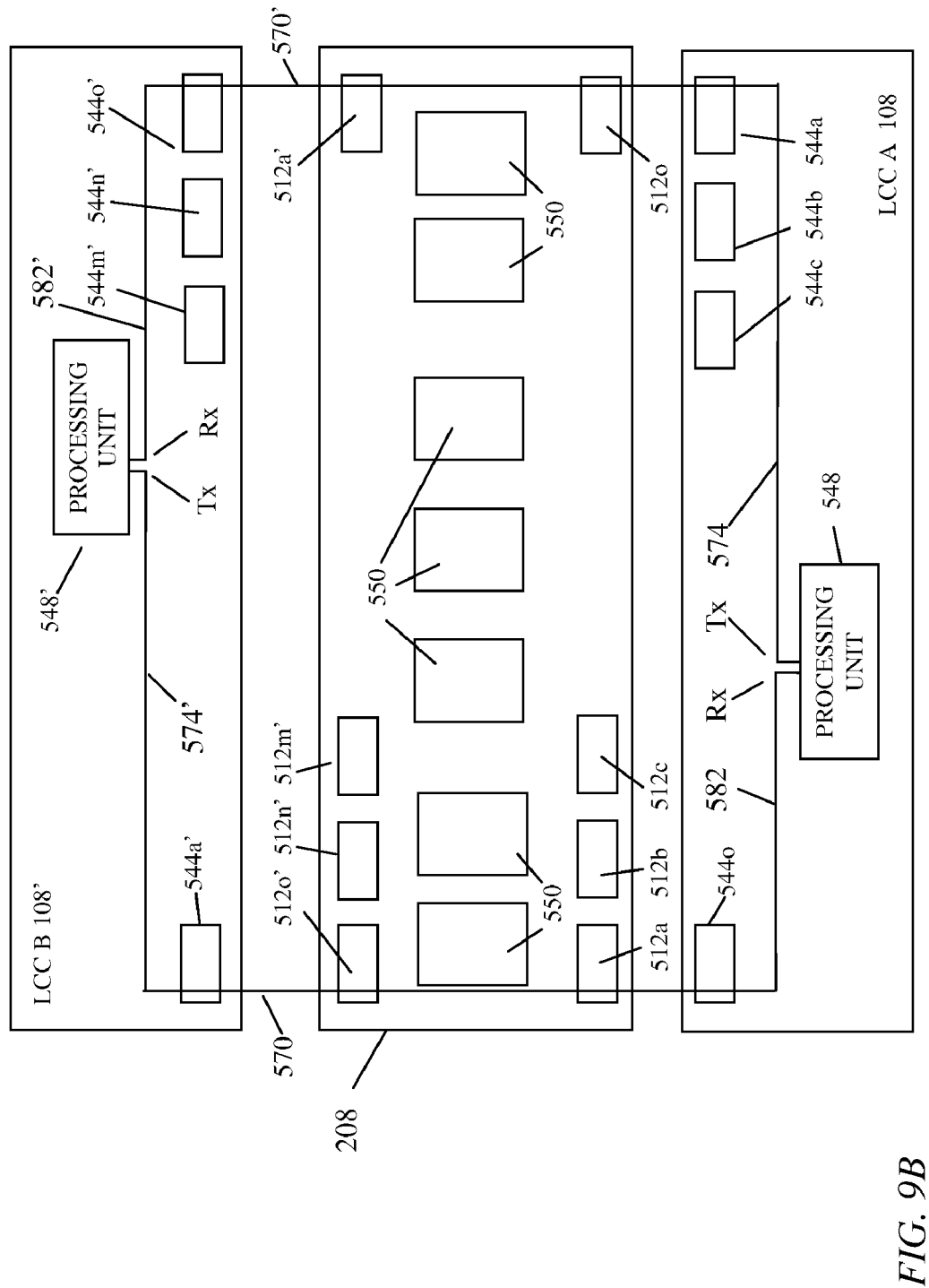
FIG. 9B is a conceptual diagram of the control cards of FIG. 8 in electrical communication with each other over separate electrical paths formed by vertical traces on the midplane of FIG. 7 and horizontal traces on the LCCs.

FIG. 9B shows another technique for establishing connections between the LCCs 108, 108'. Like the vertical traces 570, 570" described above in FIG. 9A, the vertical traces 570", 570'" are symmetrically located on the midplane 208 to provide symmetric connections with the LCCs 108, 108'. Unlike the vertical traces 570, 570' of FIG. 9A, the vertical electrical traces 570", 570'" of this embodiment do not connect to common horizontal traces on the LCCs 108, 108' to form a redundant connection. Rather, the vertical electrical traces 570", 570'" are part of separate electrical paths. For one electrical path, the vertical trace 570" is electrically connected to a horizontal electrical trace 578 on the LCC A 108 and to a horizontal electrical trace 582' on the LCC B 108'. For the other electrical path, the vertical trace 570'" is electrically connected to a horizontal electrical trace 582 on the LCC A 108 and to a horizontal electrical trace 578' on the LCC B 108'.

The particular use of such separate electrical paths depends upon the type of communications that pass between the LCCs 108, 108' For example, each processing unit 548, 548' has a transmit (Tx) terminal and a receive (Rx) terminal. Because the LCCs 108, 108' are similar in construction, inverting the LCC B 108' with respect to LCC A 108 within the enclosure 104 positions the Tx terminal of the processing unit 548 opposite the Rx terminal of the processing unit 548' and the Tx terminal of the processing unit 548' opposite the Rx terminal of the processing unit 548. As a result, connecting the Tx terminal of one processing unit to the Rx terminal of the other processing unit does not involve "crossing" traces on the midplane 208. These connections are achieved by the vertical traces 570, 570' on the midplane 208 and non-crossing horizontal traces 574, 574 on the LCCs 108. More specifically, the electrical path comprising the horizontal trace 582, vertical trace 570'", and horizontal trace 578' connects the Tx terminal of the processing unit 548 to the Rx terminal of the other processing unit 548'. Similarly, the electrical path comprising the horizontal trace 582', vertical trace 570", and horizontal trace 578 connects the Tx terminal of the processing unit 548' to the Rx terminal of the other processing unit 548.

Figure 10:
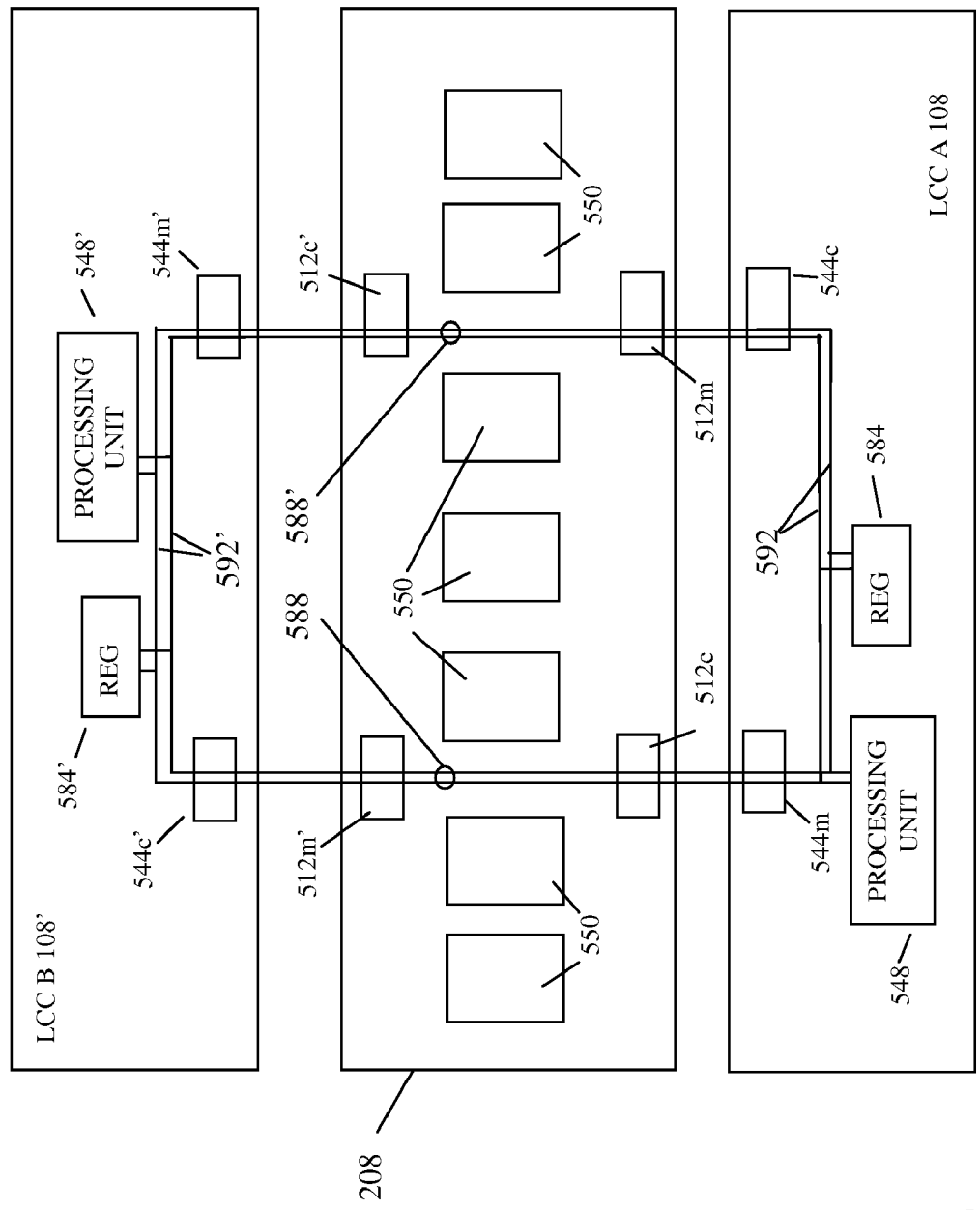
FIG. 10 is a conceptual diagram of the control cards of FIG. 8 in electrical communication with each other over a communication bus through the midplane of FIG. 7.

The technique illustrated in FIG. 9A can be used to implement a two-wire communication bus between the LCCs 108, 108'. FIG. 10 illustrates an exemplary implementation of the two-wire communication bus. The communication bus includes redundant vertical traces 588, 588' symmetrically located on the midplane 208, which are electrically connected to horizontal traces 592 on the LCC A 108 and to horizontal traces 592' on the LCC B 108'. Redundant vertical traces 588, 588' and horizontal traces 592, 592' are each comprised of two traces to implement the two-wire communication bus. The connections between the vertical traces 588, 588' and horizontal traces 592, 592' form redundant connections for each of the two-wires of the communication bus.

Each LCC 108, 108' has the processing unit 548, 548' of FIG. 8 and a register 584, 584', respectively, for storing information such as the loop ID and the enclosure address. On the LCC A 108, the processing unit 548 and register 584 are each connected to the communication bus (i.e., to the horizontal traces 592), and on the LCC B 108', the processing unit 548' and register 584' are each connected to the communication bus, (i.e., to the horizontal traces 592').

Figure 11:
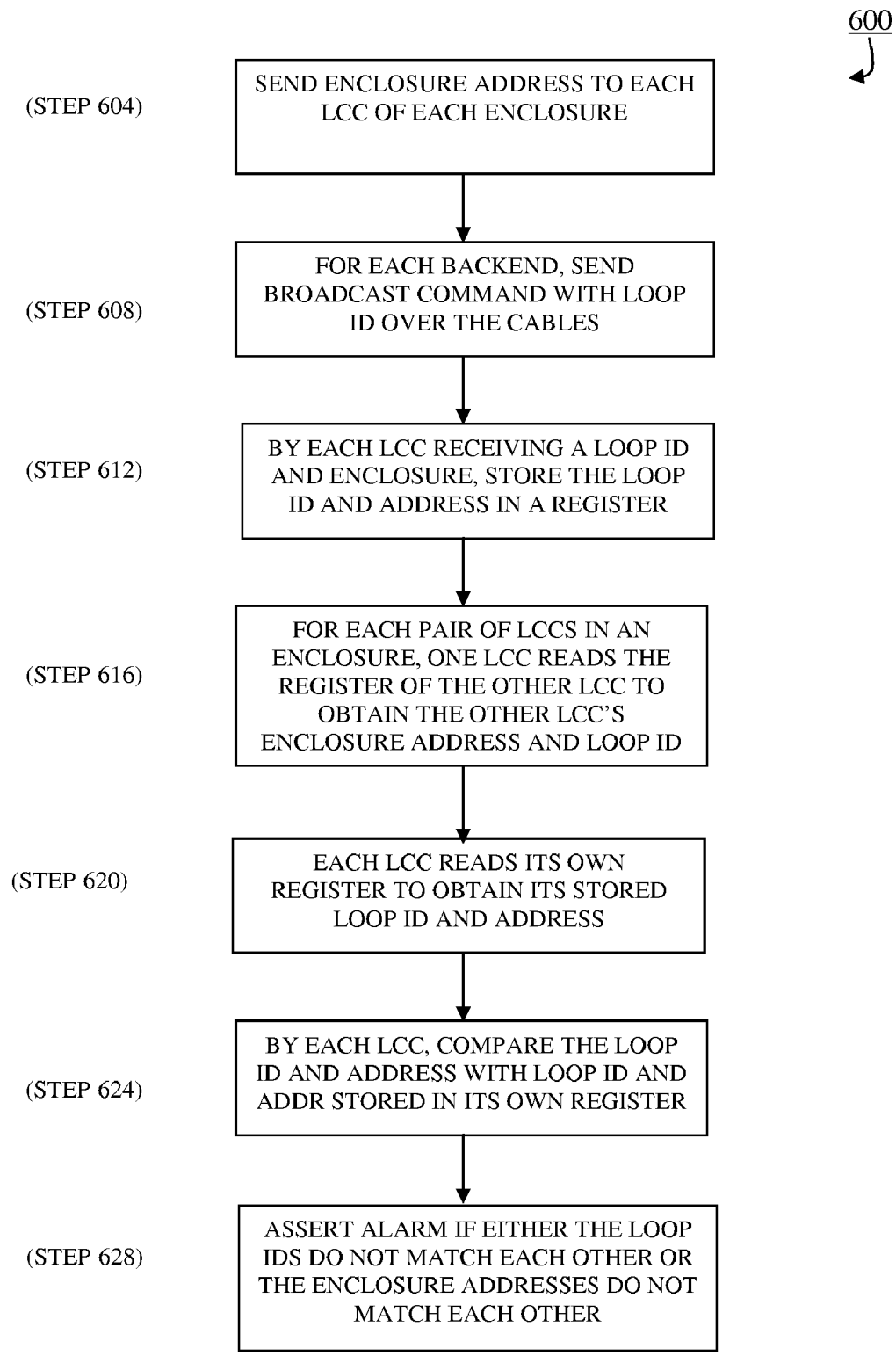
FIG. 11 is a flow diagram of an embodiment of a process for verifying the correctness of the enclosure addresses and loop IDs given to the control cards of the enclosure.

FIG. 11 shows an embodiment of a process 600 for verifying the correctness of the enclosure addresses and loop IDs sent to the LCCs installed in the enclosure 104. In the description of the process 600, reference is made also to FIG. 1 and to FIG. 10. In this embodiment, the communication bus of FIG. 10 is an I²C bus. Accordingly, devices on the bus are either master devices or slave devices. Here, the processing units 548, 548' are master devices and the registers 584, 584' are slave devices. As described below, this process 600 takes advantage of the I²C protocol, which is tailored for master-slave communication, and thus avoids having one master device attempt to communicate with another master device to obtain the loop ID and enclosure address information from each other.

More specifically, the host processor 106 sends (step 604) an enclosure address to each enclosure 104 in the data storage system 100. Each enclosure 104 is identified by a unique enclosure address. Each LCC 108, 108' of each enclosure 104 receives an enclosure address. To have proper enclosure operation, each LCC 108, 108' of that enclosure receives the same unique enclosure address. Also, for each backend the host processor 106 sends (step 608) a broadcast command containing the loop ID over the cables 136, 136'. Those LCCs connected to a given backend receive the loop ID corresponding to that backend. To have proper enclosure operation, each LCC 108, 108' of that enclosure receives the same loop ID. At step 612, the LCC A 108 stores the loop ID and the enclosure address that it receives in its own slave register 584, and the LCC B 108' stores the loop ID and the enclosure address that it receives in its own slave register 584'.

As described above in FIG. 10, each LCC 108, 108' in the enclosure is connected to the other LCC by the communication bus. Over the communication bus, each LCC 108, 108' communicates (step 616) with the slave register 584', 584 of the other LCC 108', 108 to read the information stored therein. Specifically, the processing unit 548 of the LCC A 108 requests the stored information from the slave register 584' of the LCC B 108'; similarly, the processing unit 548' of the LCC B 108' requests the stored information from the slave register 584 of the LCC A 108. At step 620, the LCC A 108 also reads the loop ID and enclosure address stored in its own register 584, and the LCC B 108' reads the loop ID and enclosure address stored in its own register 584'.

At step 624, the LCC A 108 compares the loop ID and enclosure address read from its own register 584 with the loop ID and enclosure address read from the slave register 584' of the other LCC 108'. Similarly, the LCC B 108' compares the loop ID and enclosure address read from its own register 564' with the loop ID and enclosure address read from the slave register 584 of the other LCC A 108. If either LCC 108, 108' determines that the loop IDs do not match each other or that the enclosure addresses do not match each other, that LCC asserts (step 628) an alarm. Either type of mismatch is indicative of a mis-cabled connection between two or more enclosures 104 or between the host processor 106 and the enclosures 104.

While the invention has been shown and described with reference to specific preferred embodiments, it should be understood by those skilled in the art that various changes in form and detail may be made therein without departing from the spirit and scope of the invention as defined by the following claims.

What is claimed is:

1. A midplane-less storage system comprising an enclosure including:

a control board having an electrical connector attached thereto and a processing unit;

a disk drive module including an adapter board and a disk drive, the disk drive having memory for storing data and an electrical connector, the adapter board having a first electrical connector that is directly electrically connected to the electrical connector of the disk drive, the adapter board having a controller and a second electrical connector that is mated to the electrical connector of the control board; and a communication bus extending from the control board to the disk drive module through the second electrical connector of the adapter board mated to the electrical connector of the control board and through the first electrical connector of the adapter board directly electrically connected to the electrical connector of the disk drive, the processing unit of the control board communicating with the controller of the adapter board over the communication bus in accordance with a communication protocol in order to control operation of the disk drive.

2. The storage system of claim 1, wherein the disk drive is a first disk drive and the disk drive module includes a second disk drive, the first and second disk drives each being electrically connected to the adapter board by at least one electrical signal path.

3. The storage system of claim 2, wherein a length of each electrical signal path connecting the first disk drive to the adapter board is substantially equal to a length of each electrical signal path connecting the second disk drive to the adapter board.

4. The storage system of claim 1, wherein the disk drive module is a first disk drive module and further comprising a second disk drive module, the second disk drive module having a second disk drive and an adapter board in electrical communication with the second disk drive, the adapter board of the first disk drive module and the adapter board of the second disk drive module each being in electrical communication with the control board by at least one electrical signal path, a length of each electrical signal path connecting the control board to the adapter board of the first disk drive module being substantially equal to a length of each electrical signal path connecting the control board to adapter board of the second disk drive module.

5. The storage system of claim 1, wherein the disk drive is a Fibre Channel disk drive.

6. The storage system of claim 1, wherein the disk drive is an Advanced Technology Attachment disk drive.

7. The storage system of claim 1, wherein the disk drive is a Serial Attached SCSI disk drive.

8. The storage system of claim 1, wherein the disk drive is in electrical communication with the control board over a serial low-voltage differential signaling communication path.

9. The storage system of claim 1, wherein the communication bus is an I2C bus.

10. The storage system of claim 1, wherein the communication bus is RS232 bus.

* * * * *